United States Patent
Jung et al.

(10) Patent No.: US 11,411,391 B2
(45) Date of Patent: Aug. 9, 2022

(54) ENERGY STORAGE SYSTEM PROTECTION SYSTEM

(71) Applicant: SAMSUNG SDI CO., LTD., Yongin-si (KR)

(72) Inventors: Jae Hyung Jung, Yongin-si (KR); Suk Ki Kim, Yongin-si (KR); Dong Ki Hong, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 0 days.

(21) Appl. No.: 17/137,824

(22) Filed: Dec. 30, 2020

(65) Prior Publication Data
US 2021/0249852 A1    Aug. 12, 2021

(30) Foreign Application Priority Data

Feb. 10, 2020    (KR) .................. 10-2020-0015621

(51) Int. Cl.
*H02H 7/18* (2006.01)
*H02J 7/00* (2006.01)
*H02H 1/00* (2006.01)

(52) U.S. Cl.
CPC ............ *H02H 7/18* (2013.01); *H02H 1/0007* (2013.01); *H02J 7/005* (2020.01); *H02J 7/0029* (2013.01)

(58) Field of Classification Search
CPC ..... H02H 7/18; H02J 7/0029; H02J 7/00–036
See application file for complete search history.

(56) References Cited

U.S. PATENT DOCUMENTS

| 9,866,023 | B2 | 1/2018 | Ellerkamp et al. |
| 10,153,647 | B2 | 12/2018 | Tsurumaru et al. |
| 11,114,877 | B2 | 9/2021 | Kikuchi et al. |
| 2016/0204647 | A1 | 7/2016 | Tsurumaru et al. |

FOREIGN PATENT DOCUMENTS

| CN | 103337869 B | 4/2016 |
| CN | 111641261 A * | 9/2020 |
| EP | 3278731 A1 | 2/2018 |

(Continued)

OTHER PUBLICATIONS

Translation of CN111641261A. Sep. 8, 2020. (Year: 2020).*

(Continued)

*Primary Examiner* — Jared Fureman
*Assistant Examiner* — Christopher J Clark
(74) *Attorney, Agent, or Firm* — Lee IP Law, P.C.

(57) ABSTRACT

An energy storage system (ESS) protection system includes: a battery monitoring system (BMS) configured to transmit a protection signal when an internal state or an external state of a battery cell is abnormal; a power conversion system (PCS) connected to the BMS through a hard wire, and configured to receive the protection signal through the hard wire; and an energy management system (EMS) connected between the BMS and the PCS through a universal communication line, and configured to receive the protection signal from the BMS and transmit the protection signal to the PCS. The PCS may be configured to perform an ESS shutdown when the PCS receives the protection signal through the hard wire or the universal communication line.

17 Claims, 7 Drawing Sheets

(56) References Cited

FOREIGN PATENT DOCUMENTS

| | | |
|---|---|---|
| JP | WO 2015/040723 A1 | 3/2015 |
| JP | 2016-506710 | 3/2016 |
| JP | 2016-73011 | 5/2016 |
| JP | 6384483 B | 8/2018 |
| KR | 10-1130050 B1 | 3/2012 |
| KR | 1020160041564 A | 4/2016 |
| KR | 10-2016-0109530 A | 9/2016 |
| KR | 10-1887992 B1 | 9/2018 |
| WO | WO 2019/193636 | 10/2019 |

OTHER PUBLICATIONS

Korean Notice of Allowance dated Feb. 3, 2022.
Japanese Office action dated Feb. 1, 2022.
Saleh et al. A New Digital Protection for Grid-Connected Battery Storage Systems, IEEE—978150904894 2017, pp. 1-9.
IEEE Guide for the Interoperability of Energy Storage Systems, 2015.
Korean Office action dated May 27, 2021.
European Search Report dated Jun. 21, 2021.

\* cited by examiner

ENERGY STORAGE SYSTEM PROTECTION SYSTEM

CROSS-REFERENCE TO RELATED APPLICATION

Korean Patent Application No. 10-2020-0015621, filed on Feb. 10, 2020, in the Korean Intellectual Property Office, and entitled: "Energy Storage System Protection System," is incorporated by reference herein in its entirety.

BACKGROUND

1. Field

Embodiments relate to an energy storage system protection system.

2. Description of the Related Art

An energy storage system (ESS) may be a system for storing energy generated from, e.g., renewable energy resources such as wind and solar power, etc., in a storage device (e.g., a battery), and for supplying electricity to improve power usage effectiveness.

The above-described information disclosed in the background is only for improving the understanding of the background of the art, and thus may include information not constituting the prior art.

SUMMARY

Embodiments are directed to an energy storage system (ESS) protection system, including: a battery monitoring system (BMS) configured to transmit a protection signal when an internal state or an external state of a battery cell is abnormal; a power conversion system (PCS) connected to the BMS through a hard wire, and configured to receive the protection signal through the hard wire; and an energy management system (EMS) connected between the BMS and the PCS through a universal communication line, and configured to receive the protection signal from the BMS and transmit the protection signal to the PCS. The PCS may be configured to perform an ESS shutdown when the PCS receives the protection signal through the hard wire or the universal communication line.

An internal sensor unit, configured to sense an abnormal state inside the battery cell, may be further connected to the BMS.

The internal sensor unit may include one or more of: a voltage sensor configured to sense a voltage of the battery cell; a current sensor configured to sense a current of the battery cell; or a temperature sensor configured to sense a temperature of the battery cell.

When the voltage, the current, or the temperature sensed by the internal sensor unit is out of a reference range, the BMS may transmit the protection signal to the PCS through the hard wire, and transmit the protection signal to the PCS through the universal communication line and the EMS.

An external sensor unit, configured to sense an abnormal state outside the battery cell, may be further connected to the BMS. The external sensor unit may be connected to the BMS through a second hard wire.

The external sensor unit may include one or more of: a surge voltage sensor configured to sense a surge voltage flowing into a power line that connects the battery cell and the PCS; a ground voltage sensor configured to sense a ground voltage of the power line; or a switch contact point sensor configured to sense a contact point state of a switch installed in the power line.

When the surge voltage, the ground voltage, or the switch contact point state sensed by the external sensor unit is out of a reference range, the BMS may transmit the protection signal to the PCS using the hard wire, and transmit the protection signal to the PCS using the universal communication line and the EMS.

The ESS protection system may further include an external sensor unit configured to sense an abnormal state outside the battery cell. The external sensor unit may be connected to the PCS through a second hard wire.

The external sensor unit may include one or more of: a surge voltage sensor configured to sense a surge voltage flowed into a power line that connects the battery cell and the PCS; a ground voltage sensor configured to sense a ground voltage of the power line; or a switch contact point sensor configured to sense a contact point state of a switch installed in the power line.

When the surge voltage, the ground voltage, or the switch contact point state sensed by the external sensor unit is out of a reference range, the PCS may perform the ESS shutdown.

BRIEF DESCRIPTION OF THE DRAWINGS

Features will become apparent to those of skill in the art by describing in detail example embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art. In the drawing figures, the dimensions of layers and regions may be exaggerated for clarity of illustration. Like reference numerals refer to like elements throughout.

As used herein, the term "and/or" includes any and all combinations of one or more of the listed items. In addition, it will be understood that when an element A is referred to as being "connected to" an element B, the element A can be directly connected to the element B or an intervening element C may be present and the element A and the element B may be indirectly connected to each other.

The terminology used herein is for the purpose of describing particular embodiments only and is not intended to be limiting of the disclosure. As used herein, singular forms, unless contextually defined otherwise, may include plural forms. Also, the terms "comprise" and/or "comprising" are used herein to specify the present of stated shapes, numbers, steps, operations, members, elements, and/or groups thereof but do not preclude the presence or addition of one or more other shapes, numbers, operations, members, elements and/or groups thereof.

It will be understood that though the terms first, second, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the disclosure.

A battery management system (BMS), a power conversion system (PCS), an energy management system (EMS), a control unit (controller), and/or any other relevant devices or components according to embodiments described herein may be implemented utilizing any suitable hardware, firmware (e.g. an application-specific integrated circuit), software, or a combination of software, firmware, and hardware. For example, the various components of the BMS, PCS, EMS, control unit (controller), and/or any other relevant devices or components may be formed on one integrated circuit (IC) chip or on separate IC chips. Further, the various components of the BMS, PCS, EMS, and control unit (controller) may be implemented on a flexible printed circuit film, or on a tape carrier package, a printed circuit board, or on the same substrate as the BMS, PCS, EMS, and control unit (controller). Further, each of the various components of the BMS, PCS, EMS, and control unit (controller) may be a process or thread running on one or more processors in one or more computing devices, and may execute computer program instructions and interact with other elements for performing the various functionalities described herein. The computer program instructions are stored in a memory which may be implemented in a computing device using a standard memory device, such as, for example, a random access memory (RAM). The computer program instructions may also be stored in other non-transitory computer readable media such as, a CD-ROM, flash drive, and the like. Also, a person of skill in the art should recognize that the functionality of various computing devices may be combined or integrated into a single computing device, or the functionality of a particular computing device may be distributed across one or more other computing devices.

Figure 1:
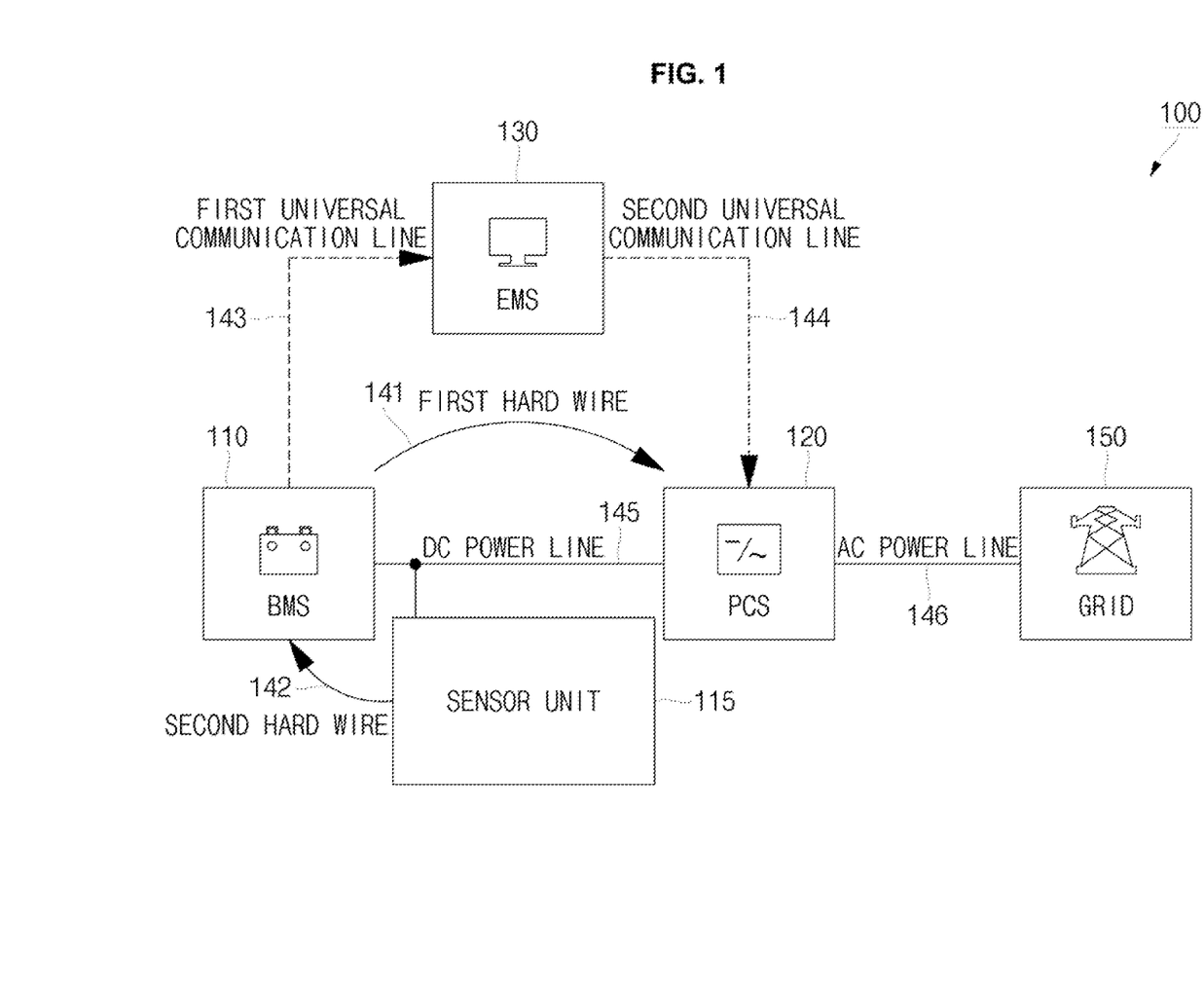
FIGS. 1 and 2 are block diagrams illustrating configurations of an energy storage system (ESS) protection system according to an example embodiment.
Figure 2:
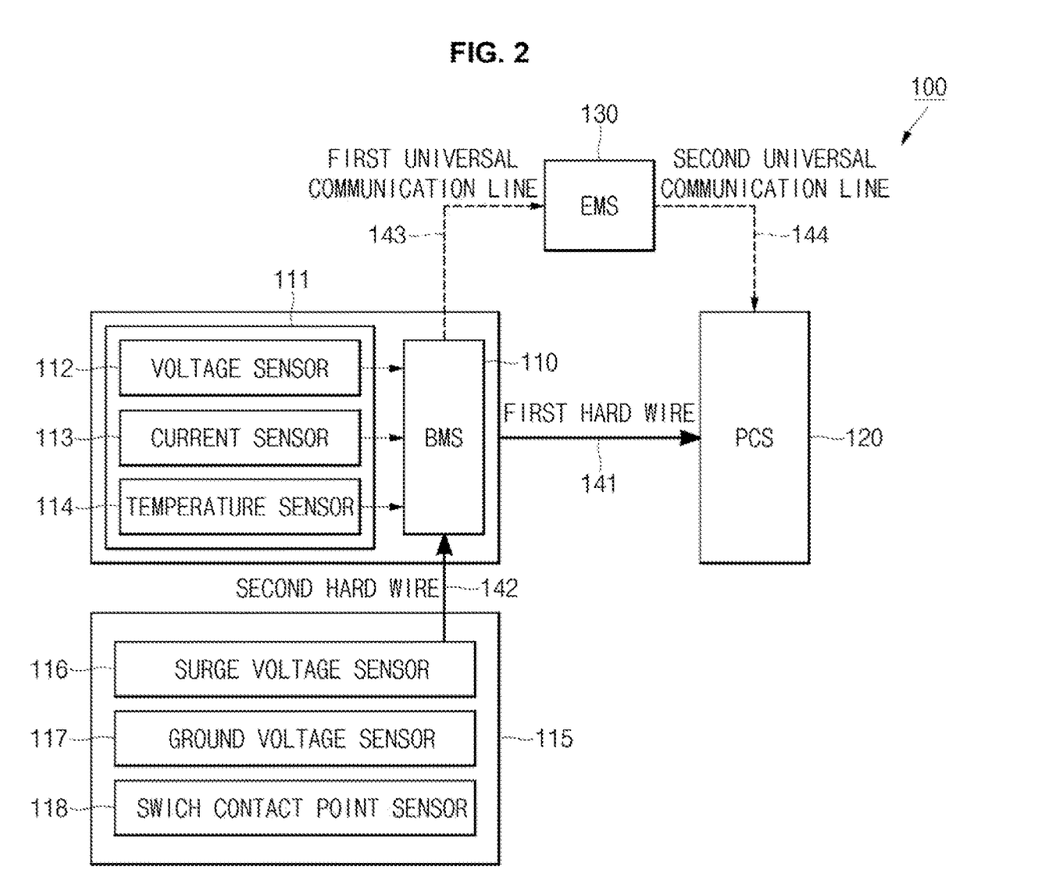

FIGS. 1 and 2 are block diagrams illustrating configurations of an energy storage system (ESS) protection system 100 according to an example embodiment.

As shown in FIGS. 1 and 2, the ESS protection system 100 may include a BMS 110, a PCS 120 connected to the BMS 110 through a first hard wire 141, and an EMS 130 connected to the BMS 110 and PCS 120 through universal communication lines 143 and 144.

The BMS 110 may sense an internal state and/or external state of a battery cell, and generate and transmit a system protection signal to the PCS 120 and/or EMS 130, e.g., when the internal state and/or external state of the battery cell is in an abnormal state according to the sensed result. In an example embodiment, the BMS 110 may immediately transmit the system protection signal to the PCS 120 in a hard-wired manner through a first hard wire 141 in real time.

In an example embodiment, the BMS 110 may synchronize the system protection signal with a predetermined clock period in the EMS 130, and transmit the synchronized system protection signal through the universal communication line (e.g., the first universal communication line 143) in a universal communication manner (e.g., TCP/IP, RS485, or CAN, etc.).

The PCS 120 may be connected to the BMS 110 through the first hard wire 141, and may be connected to the EMS 130 with the universal communication line (e.g., the second universal communication line 144). The PCS 120 may receive system protection signals from both the BMS 110 and the EMS 130. In an example embodiment, the PCS 120 may receive the system protection signal from the BMS 110 in a hard-wired manner through the first hard wire 141. In an example embodiment, the PCS 120 may receive the system protection signal synchronized with the clock period from the EMS 130 through the universal communication line (e.g., the second universal communication line 144) in the universal communication manner (e.g., TCP/IP, RS485, or CAN, etc.).

The hard-wired manner is for transmitting and receiving information using an electrical signal of two states (for example, a high level signal or a low level signal, for another example, DC 24 V or 0 V) between devices, and may be implemented only with hardware without software. In this manner, a delay time may be very small.

The universal communication manner is for transmitting and receiving information in synchronization with a preset clock period, and may also use software for encoding and decoding transmission and reception information. In this manner, the delay time may be relatively long (in some cases, 2 seconds or longer).

The PCS 120 may be connected to a battery cell through a DC power line 145 to receive DC power. The PCS 120 may convert the DC power to AC power to supply the AC power to a grid 150 through an AC power line 146. The PCS 120 may convert the AC power received from the grid 150 through the AC power line 146 into the DC power for the battery cell.

The EMS 130 may be connected to the BMS 110 through the first universal communication line 143, and may be connected to the PCS 120 through the second universal communication line 144. Accordingly, the EMS 130 may receive the system protection signal from the BMS 110 through the first universal communication line 143 and subsequently deliver (transmit) the system protection signal to the PCS 120 through the second universal communication line 144.

According to the present example embodiment, when receiving the system protection signal through any one among the hard wire and the universal communication line, the PCS 120 may immediately shut the ESS down. Accordingly, when sensing an abnormal (e.g., dangerous) state inside and/or outside the battery cell, the BMS 110 may swiftly transmit a system protection signal corresponding to the abnormal state to the PCS 120 through the hard wire as well as through the universal communication line, and thus the PCS 120 may immediately shut the ESS down.

An internal sensor unit 111 and/or an external sensor unit 115 may be connected to the BMS 110. The internal sensor unit 111 may sense an abnormal state inside the battery cell and transmit the result to the BMS 110. The external sensor unit 115 may sense an abnormal state outside the battery cell and transmit the result to the BMS 110.

In an example embodiment, the internal sensor unit 111 may include a voltage sensor 112, a current sensor 113, and/or a temperature sensor 114. The voltage sensor 112 may sense the voltage of the battery cell and transmit the result to the BMS 110. The current sensor 113 may sense the current of the battery cell and transmit the result to the BMS 110. The temperature sensor 114 may sense the temperature of the battery cell and transmit the result to the BMS 110.

When the voltage, current, and/or temperature sensed using the internal sensor unit 111 are/is out of preset reference ranges/range, then BMS 110 may primarily transmit the system protection signal to the PCS 120 through the hard wire, and secondarily transmit the system protection signal subsequently or simultaneously to EMS 130 through the universal communication line (e.g., the first universal communication line 143). The EMS 130 may deliver (transmit) the system protection signal to the PCS 120 through the second universal communication line 144.

The reference ranges may include a reference voltage range, a reference current range, and/or a reference temperature range. When the voltage, current, and/or temperature sensed through the voltage sensor 112, the current sensor 113, and/or the temperature sensor 114 respectively are/is out of the reference ranges/range, the BMS 110 may transmit the system protection signal to the PCS 120 through the hard wire, and transmit the system protection signal to the EMS 130 through the universal communication line (e.g., the first universal communication line 143). The EMS 130 may transmit the system protection signal to the PCS 120 through the second universal communication line 144.

The surge voltage and/or the ground voltage being out of the preset reference ranges/range may mean that the surge voltage and/or the ground voltage are/is out of a manageable normal range and in a non-manageable abnormal range. Thus, the surge voltage being out of the preset reference range may mean that the surge voltage is in a surge voltage range that is not manageable by the system. The ground voltage being out of the preset reference range may mean that the ground voltage is in a ground voltage range that is not manageable by the system. The surge voltage and/or the ground voltage being out of the preset reference ranges/range may be differently analyzed according to the meaning of the reference voltage.

In an example embodiment, the external sensor unit 115 may be connected to the BMS 110 through a second hard wire 142. For example, the external sensor unit 115 may sense an external state of the battery cell and transmit the result to the BMS 110 through the second hard wire 142 in a hard-wired manner.

In an example embodiment, the external sensor unit 115 may include a surge voltage sensor 116, a ground voltage sensor 117, and/or a switch contact point sensor 118. The surge voltage sensor 116 may sense a surge voltage flowing in the DC power line 145 that connects the battery cell with the PCS 120. The surge voltage sensor 116 may sense a surge voltage flowing in the AC power line 146. The ground voltage sensor 117 may sense a ground voltage flowing in the DC power line 145 and/or the AC power line 146. The switch contact point sensor 118 may sense a contact point state of switches/a switch installed in the DC power line 145 and/or AC power line 146. Such sensed information may be transmitted to the BMS 110 through the second hard wire 142.

When the surge voltage, the ground voltage, and/or the switch contact point state sensed by the external sensor unit 115 are/is out of the preset reference ranges/range, the BMS 110 may transmit the system protection signal to the PCS 120 through the first hard wire 141, and may transmit the system protection signal to the EMS 130 through the first universal communication line 143. The EMS 130 may deliver (transmit) the system protection signal to the PCS 120 through the second universal communication line 144.

When receiving the system protection signals/signal through the hard wire and/or universal communication line (e.g., the second universal communication line 144), the PCS 120 may immediately shut the ESS down.

As described above, an example embodiment may provide an ESS protection system 100 that may protect the battery by swiftly detecting and rapidly and safely notifying the abnormal (dangerous) situation to the PCS 120 through at least two paths, even when the internal and/or external state of the battery is abnormal.

Figure 3:
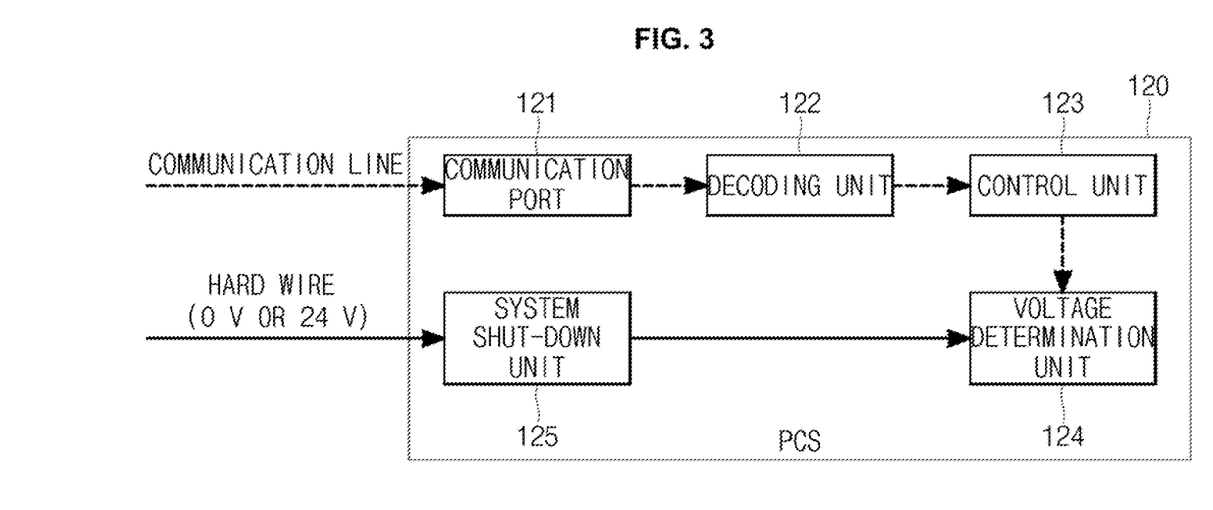
FIG. 3 is a block diagram illustrating a configuration of a power conversion system (PCS) in an ESS protection system according to an example embodiment.

FIG. 3 is a block diagram illustrating a configuration of the PCS 120 in the ESS protection system 100 according to an example embodiment.

As shown in FIG. 3, the PCS 120 may include a communication port 121 and a decoding unit 122 in order to receive the system protection signal (for example, a digital signal synchronized with a clock signal and encrypted) through the universal communication line. In an example embodiment, the communication port 121 may receive the system protection signal, and the decoding unit 122 may decode the system protection signal. The control unit 123 may output a system shutdown signal to a system shut down unit 124 on the basis of information decoded by the decoding unit 122.

The PCS 120 may include a voltage determination unit 125 for determining a voltage level (e.g., a high level voltage signal or a low level voltage signal) of the system protection signal received through the hard wire. In some example, when the high level voltage is converted into the low level voltage, the voltage determination unit 125 may immediately output the system shutdown signal to the system shut down unit 124, and the reverse is also possible.

In this way, an operation time of the system shut down unit 124, which is based on the system protection signal through the universal communication line, is relatively shorter than that based on the system protection signal through the hard wire. Accordingly, the ESS protection system 100 according to an example embodiment may swiftly shut the ESS down by transmitting the system protection signal in the hard-wired manner.

Figure 4:
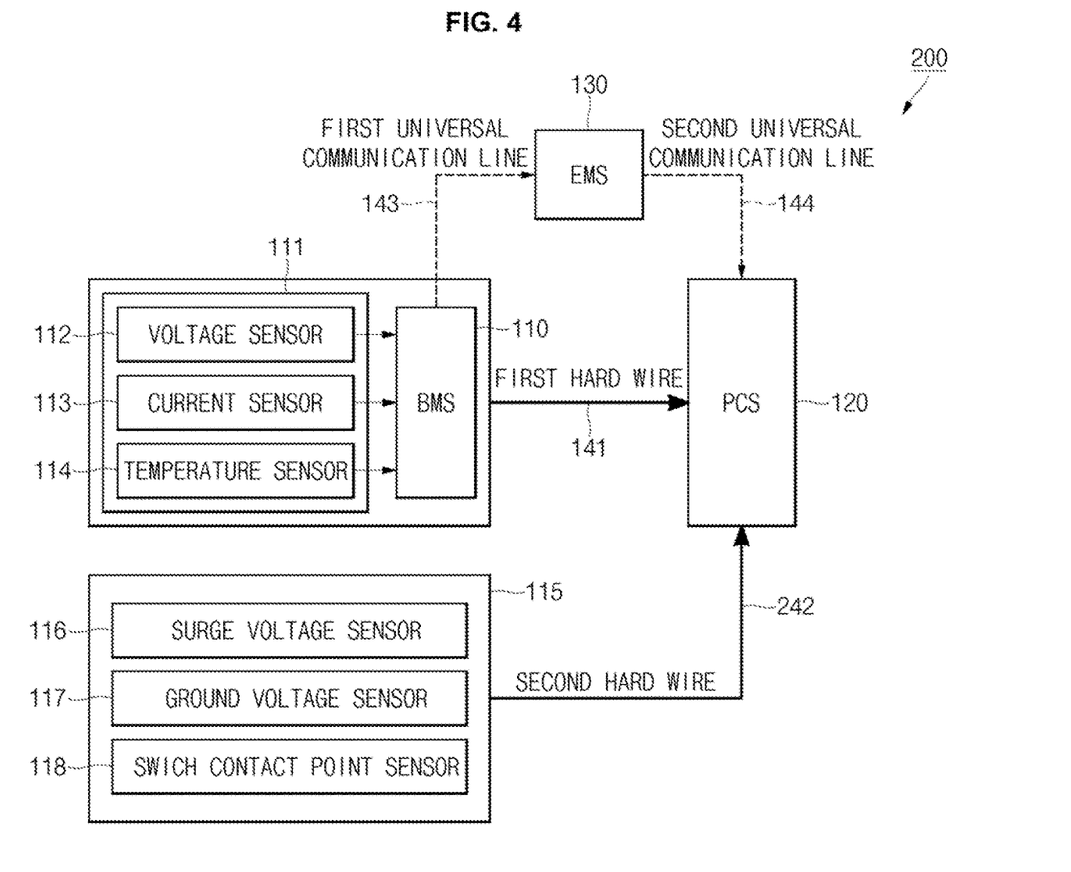
FIG. 4 is a block diagram illustrating a configuration of an ESS protection system according to an example embodiment.

FIG. 4 is a block diagram illustrating a configuration of an ESS protection system 200 according to an example embodiment.

Referring to FIG. 4, the ESS protection system according to an example embodiment may include an external sensor unit 115 that is directly connected to the PCS 120 through a second hard wire 242.

The external sensor unit 115 may directly transmit information (e.g., about the surge voltage, the ground voltage, and/or the switch contact point state of the DC power line 145 and/or the AC power line 146) to the PCS 120 through the second hard wire 242. Accordingly, when, e.g., the surge voltage, the ground voltage, and/or the switch contact point state sensed using the external sensor unit 115 are/is out of the preset reference ranges/range, the PCS 120 may swiftly shut the ESS down. It will be understood that this configuration may be combined with an example embodiment as described above in connection with FIG. 2.

Figure 5A:
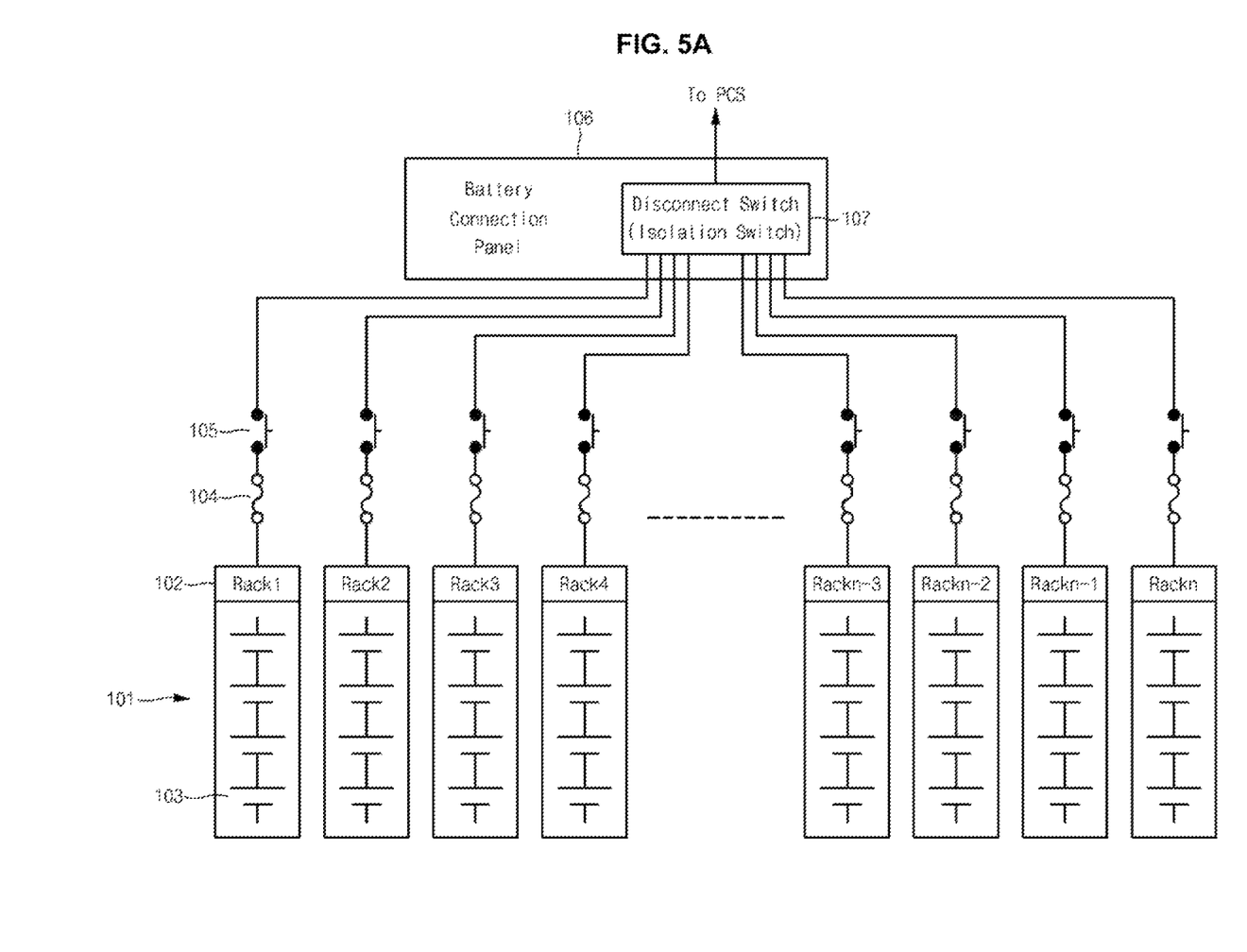
FIGS. 5A and 5B are block diagrams illustrating configurations of a battery in an ESS protection system according to example embodiments.
Figure 5B:
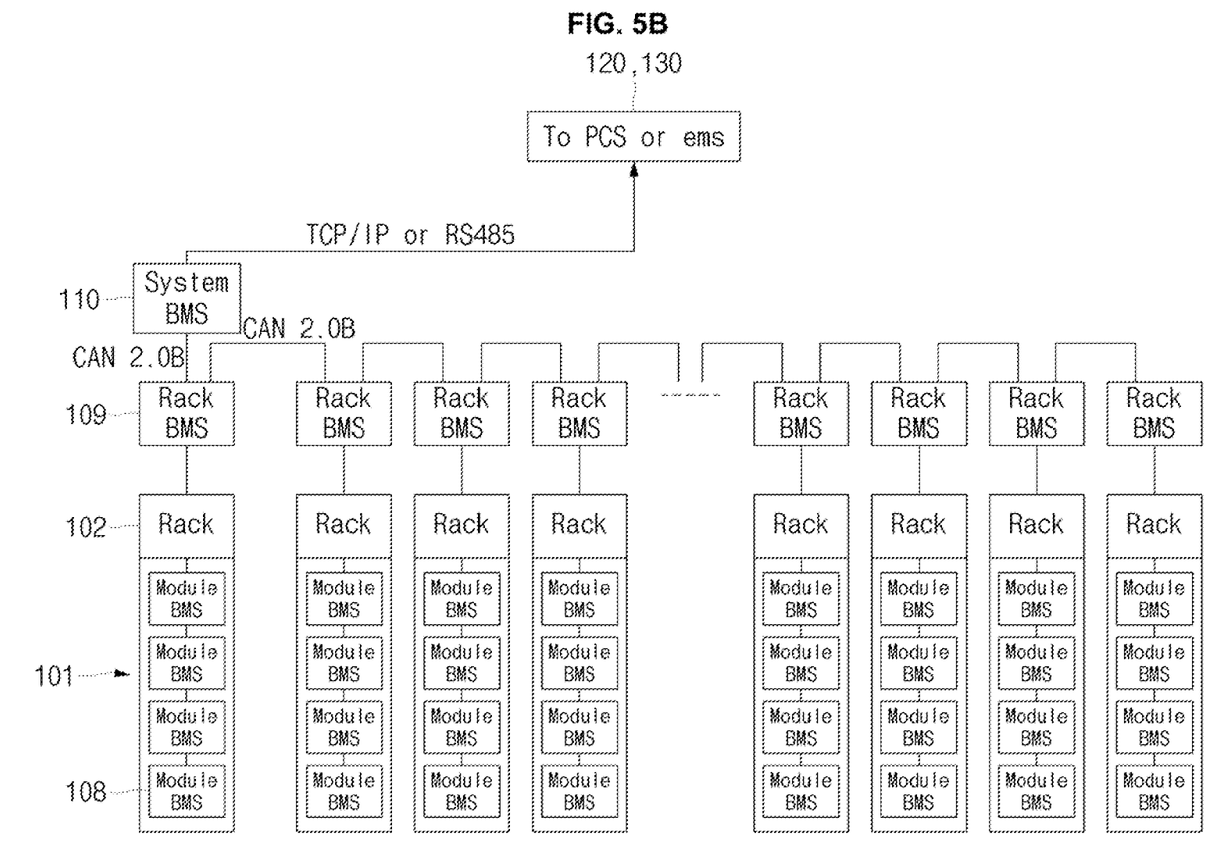

FIGS. 5A and 5B are block diagrams illustrating configurations of a battery 101, which may be implemented in the ESS protection system 100 according to example embodiments. FIG. 5A illustrates an electrical block diagram of the battery 101, and FIG. 5B illustrates a communication block diagram of the battery 101.

FIGS. 5A and 5B are merely examples that are provided for explaining an electrical connection configuration between a battery connection panel 106 and the PCS 120, and a communication connection configuration between the BMS 110 and the PCS 120 or the EMS 130, and the implementations may be varied from the illustrations.

In an example embodiment, the battery 101 may include a plurality of racks 102 (e.g., Rack1, Rack2, . . . , Rackn), which may be connected in series and/or in parallel. Each rack 102 may include a plurality of battery cells 103, which may be connected in series and/or in parallel. Each rack 102 may be connected to the battery connection panel 106 via a fuse 104 and a switch 105, which may be connected in series. The battery connection panel 106 may be electrically connected to the PCS 120 through the DC power line 145. The battery connection panel 106 may include a disconnect switch (isolation switch) 107. A contact state of the disconnect switch 107 may be sensed by the switch contact point sensor 118, described above.

Referring to FIG. 5B, the battery 101 may include a plurality of rack battery management systems (Rack BMSes) 109, which may be connected in series and/or in parallel through the universal communication line (e.g., CAN 2.0B or CAN bus). Each rack BMS 109 may be connected to the BMS 110 (referred to here as the system BMS 110) through the universal communication line (e.g., CAN). The system BMS 110 may be communicably connected to the PCS 120 and/or the EMS 130 through the universal communication line (e.g., TCP/IP or RS485). The system BMS 110 may directly or indirectly transmits the system protection signal to the PCS 120 through the hard wire and/or the universal communication line. Each rack 102 may include a plurality of module BMSes 108 that manage the plurality of battery cells 103 for each module unit, the plurality of module BMSes 108 may be managed by the rack BMS 109, and the plurality of rack BMS 109 may be managed by the system BMS 110.

Figure 6:
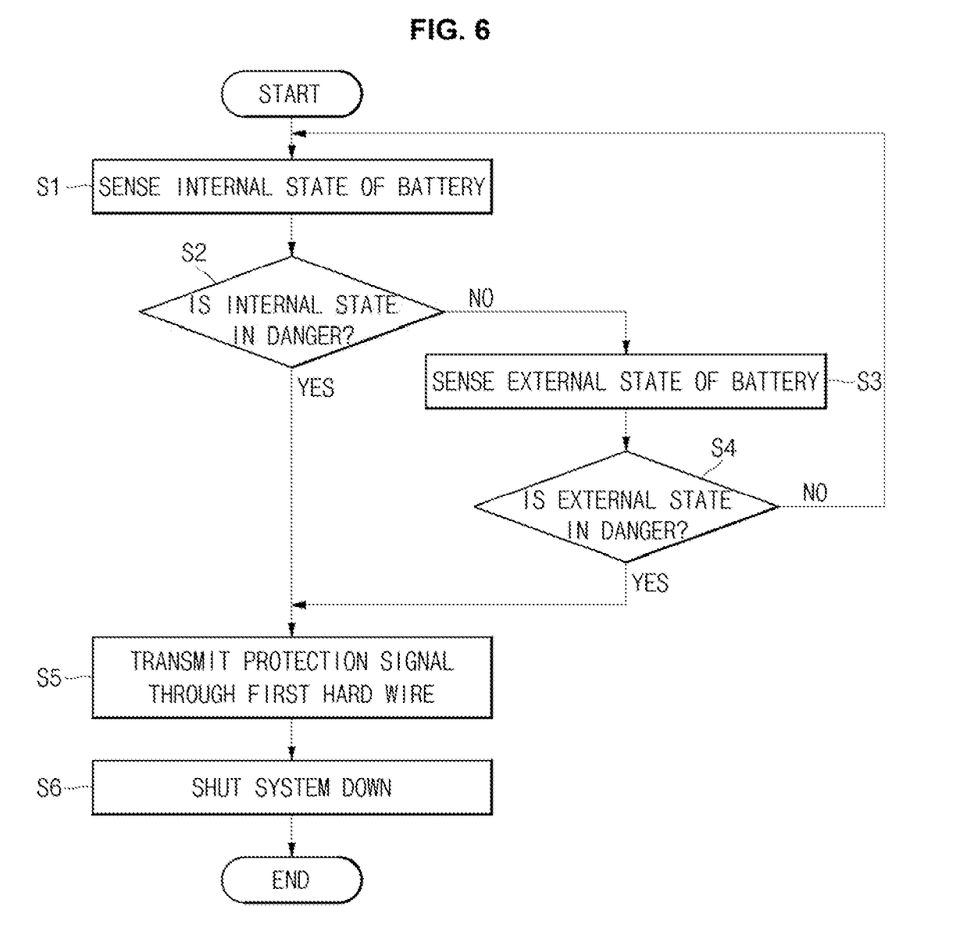
FIG. 6 is a flowchart illustrating an operation sequence of an ESS protection system according to an example embodiment.

FIG. 6 is a flowchart illustrating an operation sequence of an ESS protection system according to an example embodiment.

As shown in FIG. 6, and as described in further detail below, the operation of the ESS protection system 100 according to an example embodiment may include an operation S1 that senses an internal state of a battery, an operation S2 that determines whether the internal state of the battery is in a dangerous state, an operation S3 that senses an external state of the battery, an operation S4 that determines whether the external state of the battery is in a dangerous state, an operation S5 that transmits a protection signal through the first hard wire 141, and an operation S6 that performs or initiates a system shut down.

In the operation S1 for sensing the internal state of the battery, the BMS 110 may use the internal sensor unit 111 to sense at least one among the voltage, the current, and/or the temperature of the battery 101 or battery cell(s) 103. In an example embodiment, the BMS 110 may use the voltage sensor 112 to sense the voltage of the battery cell 103, use the current sensor 113 to sense the current of the battery cell 103, and/or use the temperature sensor 114 to sense the temperature of the battery cell 103.

In the operation S2 for determining whether the internal state of the battery is in a dangerous state, the BMS 110 may evaluate the information from the internal sensor unit 111 to determine whether at least one among the voltage, the current, and/or the temperature is out of the preset reference range. In an example embodiment, when the voltage sensed by the voltage sensor 112 is out of the preset reference voltage range, the current sensed by the current sensor 113 is out of the preset reference current range, and/or the temperature sensed by the temperature sensor 114 is out of the preset reference temperature range, the BMS 110 may determine that the internal state of the battery cell is in a dangerous state.

In the operation S3 for sensing an external state of the battery, the BMS 110 may use the external sensor unit 115 to sense whether the surge voltage has flowed into the DC power line 145 and/or the AC power line 146 (which connect/connects the battery (cell) and the PCS 120), to sense whether the ground voltage has flowed into the DC power line 145 and/or the AC power line 146, and/or to sense the state/states of switch contact point(s) installed in the DC power line 145 and/or the AC power line 146. In an example embodiment, the BMS 110 may senses the surge voltages/voltage of the DC power line 145 and/or the AC power line 146 using the surge voltage sensor 116, may sense the ground voltages/voltage of the DC power line 145 and/or the AC power line 146 using the ground voltage sensor 117, and/or may sense the contact point states/state of the switches/switch installed in the DC power line 145 and/or the AC power line 146 using the switch contact point sensor 118. The value(s) sensed using the external sensor unit 115 may be transmitted to the BMS 110 through the second hard wire 142.

In the operation S4 for determining whether the external state of the battery is in a dangerous state, the BMS 110 may determine whether at least one among the surge voltage, the ground voltage, and/or the switch contact point state (which are/is acquired using the external sensor unit 115 and the second hard wire 142), are/is out of the preset reference ranges/range. In an example embodiment, when the surge voltage sensed by the surge voltage sensor 116 is out of the preset reference surge voltage range, when the ground voltage sensed by the ground voltage sensor 117 is out of the preset reference ground voltage range, and/or when the switch contact point state sensed by the switch contact point sensor is out of the preset reference contact point state range, the BMS 110 may determine that the external state of the battery cell is in a dangerous state.

In the operation S5 for transmitting a protection signal through the first hard wire 141, the BMS 110 may directly transmit the system protection signal to the PCS 120 using the first hard wire 141. The BMS 110 may also transmit the system protection signal to the EMS 130 through the first universal communication line 143. Accordingly, the EMS 130 may deliver (transmit) the system protection signal to the PCS 120 through the second universal communication line 144. When the voltage, the current, and/or the temperature sensed by the internal sensor unit 111 are/is out of the reference ranges/range, and/or when the surge voltage, the ground voltage, and/or the switch contact point state sensed by the external sensor unit 115 are/is out of the reference ranges/range, the BMS 110 may sequentially or simultaneously transmit the system protection signals to the PCS 120.

In the operation S6 for system shut down, when the PCS 120 receives the system protection signal from at least one among the first hard wire 141 and/or the universal communication line (as described above), the PCS 120 may immediately shut the ESS down to prevent the ESS from operating in a dangerous state. As the external sensor unit 115 is directly connected to the PCS 120 through the second hard wire 242, when the external state of the battery is in a dangerous state, the PCS 120 may shut the ESS down by directly receiving the system protection signal from the external sensor unit 115 without via the BMS 110.

Thus, when an abnormal (dangerous) situation occurs inside the battery and/or outside the battery, the ESS protection system 100 may immediately transmit the system protection signal to the PCS 120 in the hard-wired manner, and, at substantially the same time, transmit the system protection signal to the EMS 130 through the universal communication line. Accordingly, the PCS 120 may rapidly sense and respond to the abnormal (dangerous) situation of the ESS through the two different paths, thus enhancing protection of the ESS.

By way of summation and review, a general ESS may include a battery, a power conversion system (PCS, which may perform an AC-DC conversion function and a DC distribution function), and an energy management system (EMS, which may operate and control the entire ESS system), etc. Voltage, current, temperature, etc., of the battery may be monitored and managed by a battery management system (BMS), and the BMS may transmit and receive information in a constant period with the EMS through a universal communication line (e.g., TCP/IP, RS485, CAN, or the like). When an abnormal situation (e.g., when the voltage, current, or temperature is out of a reference range) occurs in the battery, the BMS may inform the EMS of an abnormal (dangerous) situation, and, in response, the EMS may transmit a system shutdown command to the PCS through a communication line. The PCS, having been informed of the abnormal (dangerous) situation through the communication line, may then shut down a power supply system to protect the ESS. However, such a protection operation is implemented with a communication line that has a certain period, and thus it may take at least two seconds to shut the power system down, from the time of occurrence of the abnormal situation. Undue delay in shutdown may cause damage, a fire, etc., in the battery. Furthermore, if a fault occurs in the communication line between devices, more time may be taken to perceive and respond to the abnormal (dangerous) situation. In addition, protection from a dangerous situation (e.g., an external high surge voltage, a ground voltage, a switch contact point fault, etc.) occurring outside the battery may not be suitably performed.

As described above, embodiments may provide an energy storage system protection system that may swiftly perceive and respond to an abnormal (dangerous) situation inside and/or outside a battery, rapidly and reliably deliver a system protection signal corresponding to the abnormal situation to surrounding systems (e.g., a power conversion system) through at least two paths, and thus may enhance protection of the system.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with example embodiments unless otherwise specifically indicated. Accordingly, it will be understood by those of skill in the art that various changes in form and details may be made without departing from the spirit and scope of the present invention as set forth in the following claims.

What is claimed is:

1. An energy storage system (ESS) protection system, comprising:
    a battery monitoring system (BMS) configured to transmit a first protection signal and a second protection signal when an internal state or an external state of a battery cell is abnormal;
    a power conversion system (PCS) connected to the BMS through a hard wire, and configured to receive the first protection signal through the hard wire; and
    an energy management system (EMS) connected between the BMS and the PCS through a universal communication line, and configured to receive the second protection signal from the BMS and transmit the second protection signal to the PCS,
    wherein the first protection signal transmitted to the PCS through the hard wire is a two-state signal, and
    wherein the PCS is configured to perform an ESS shutdown when the PCS receives the first protection signal through the hard wire or receives the second protection signal through the universal communication line.

2. The ESS protection system as claimed in claim 1, wherein an internal sensor unit, configured to sense an abnormal state inside the battery cell, is further connected to the BMS.

3. The ESS protection system as claimed in claim 2, wherein the internal sensor unit includes one or more of:
    a voltage sensor configured to sense a voltage of the battery cell;
    a current sensor configured to sense a current of the battery cell; or
    a temperature sensor configured to sense a temperature of the battery cell.

4. The ESS protection system as claimed in claim 3, wherein, when the voltage, the current, or the temperature sensed by the internal sensor unit is out of a reference range, the BMS transmits the first protection signal to the PCS through the hard wire, and transmits the second protection signal to the PCS through the universal communication line and the EMS.

5. The ESS protection system as claimed in claim 1, wherein an external sensor unit, configured to sense an abnormal state outside the battery cell, is further connected to the BMS, and wherein the external sensor unit is connected to the BMS through a second hard wire.

6. The ESS protection system as claimed in claim 5, wherein the external sensor unit includes one or more of:
    a surge voltage sensor configured to sense a surge voltage flowing into a power line that connects the battery cell and the PCS;
    a ground voltage sensor configured to sense a ground voltage of the power line; or
    a switch contact point sensor configured to sense a contact point state of a switch installed in the power line.

7. The ESS protection system as claimed in claim 6, wherein, when the surge voltage, the ground voltage, or the switch contact point state sensed by the external sensor unit is out of a reference range, the BMS transmits the first protection signal to the PCS using the hard wire, and transmits the second protection signal to the PCS using the universal communication line and the EMS.

8. The ESS protection system as claimed in claim 1, further comprising:
    an external sensor unit configured to sense an abnormal state outside the battery cell,
    wherein the external sensor unit is connected to the PCS through a second hard wire.

9. The ESS protection system as claimed in claim 8, wherein the external sensor unit includes one or more of:
- a surge voltage sensor configured to sense a surge voltage flowed into a power line that connects the battery cell and the PCS;
- a ground voltage sensor configured to sense a ground voltage of the power line; or
- a switch contact point sensor configured to sense a contact point state of a switch installed in the power line.

10. The ESS protection system as claimed in claim 9, wherein, when the surge voltage, the ground voltage, or the switch contact point state sensed by the external sensor unit is out of a reference range, the PCS performs the ESS shutdown.

11. The ESS protection system as claimed in claim 1, wherein the first protection signal has a first state that is a high level signal and a second state that is a low level signal.

12. The ESS protection system as claimed in claim 11, wherein the first protection signal in the second state, which is the low level, causes the PCS to perform the ESS shutdown.

13. The ESS protection system as claimed in claim 11, wherein the first protection signal in the first state, which is the high level, causes the PCS to perform the ESS shutdown.

14. The ESS protection system as claimed in claim 1, wherein the first protection signal has a first state that is 24V DC and has a second state that is 0V DC.

15. The ESS protection system as claimed in claim 14, wherein the first protection signal in the second state, which is 0V DC, causes the PCS to perform the ESS shutdown.

16. The ESS protection system as claimed in claim 14, wherein the first protection signal in the first state, which is 24V DC, causes the PCS to perform the ESS shutdown.

17. The ESS protection system as claimed in claim 1, wherein the hard wire is a single wire.

* * * * *